United States Patent [19]
Grondahl et al.

[11] 3,844,679
[45] Oct. 29, 1974

[54] PRESSURIZED SERPENTINE COOLING CHANNEL CONSTRUCTION FOR OPEN-CIRCUIT LIQUID COOLED TURBINE BUCKETS

[75] Inventors: Clayton M. Grondahl, Elnora; John Moore, Schenectady, both of N.Y.

[73] Assignee: General Electric Company, Schenectady, N.Y.

[22] Filed: Mar. 28, 1973

[21] Appl. No.: 345,539

[52] U.S. Cl. ............................ 416/97, 416/95
[51] Int. Cl. ............................................ F01d 5/18
[58] Field of Search .................... 416/92, 95, 96, 97

[56] References Cited
UNITED STATES PATENTS

| | | | |
|---|---|---|---|
| 2,888,241 | 5/1959 | Stalker | 416/92 |
| 2,888,243 | 5/1959 | Pollock | 416/92 |
| 2,906,494 | 9/1959 | McCarty et al. | 416/96 |
| 3,220,697 | 11/1965 | Smuland et al. | 416/96 |
| 3,370,829 | 2/1968 | Banthin et al. | 416/97 UX |
| 3,446,482 | 5/1969 | Kydd | 416/97 UX |
| 3,515,206 | 6/1970 | Ward et al. | 416/95 X |
| 3,658,439 | 4/1972 | Kydd | 416/97 |
| 3,736,071 | 5/1973 | Kydd | 416/97 |

Primary Examiner—Everette A. Powell, Jr.
Attorney, Agent, or Firm—Leo I. MaLossi; Joseph T. Cohen; Jerome C. Squillaro

[57] ABSTRACT

Individually fed convoluted cooling channels are provided for open-circuit liquid cooled turbine buckets. Each convoluted channel is fed liquid coolant directly from a gutter on the rotor rim via a coolant supply conduit. Openings to the coolant supply conduits are spaced at even intervals along the circumference of the gutter and a U-trap is located in each coolant supply conduit to provide a liquid seal to prevent the reverse flow of gas or vapor from the convoluted cooling channel pattern in flow communication therewith.

10 Claims, 4 Drawing Figures

PATENTED OCT 29 1974

PRESSURIZED SERPENTINE COOLING CHANNEL CONSTRUCTION FOR OPEN-CIRCUIT LIQUID COOLED TURBINE BUCKETS

BACKGROUND OF THE INVENTION

Structural arrangements for the open-circuit liquid cooling of gas turbine buckets are shown in U.S. Pat. Nos. 3,446,481 — Kydd and 3,446,482 — Kydd. The bucket cooling is accomplished by means of a large number of cooling channels extending radially from the root toward the tip. Arrangements for metering liquid coolant to each of such cooling channels are shown in U.S. Pat. No. 3,658,439 — Kydd and in U.S. Pat. application Ser. No. 285,633 — Moore (assigned to the assignee of the instant invention). Both Kydd '439 and the Moore application employ axially extending weir construction for the metering. In addition, the Moore application describes structure by which reverse flow of coolant vapor formed in the coolant channels is prevented. These patents and patent application are incorporated by reference.

Open-circuit liquid cooling capability is particularly important, because it makes feasible increasing the turbine inlet temperature to an operating range of from 2,500°F to at least 3,500°F thereby obtaining an increase in power output ranging from about 100 to 200 percent and an increase in thermal efficiency ranging to as high as 50 percent. Such open-circuit liquid-cooled turbine structures are referred to as "ultra high temperature" gas turbines.

Liquid coolant metering is complicated by the extremely high bucket tip speeds employed resulting in centrifugal fields of the order of 250,000 G. Under such severe operating conditions even slight errors in manufacture of the weir structure can orient the weir slightly askew of the axis of rotation and produce non-uniform coolant distribution to the cooling channels. Also, any distortion of the turbine disk or disk rim induced at speed can produce a similar effect.

SUMMARY OF THE INVENTION

The instant invention employs in combination cooling channels by which coolant is conducted from the root toward the tip of a turbine bucket by a convoluted path and means in flow communication therewith for preventing the reverse flow of coolant vapor (or gas). The reverse flow preventing means is disposed between each convoluted (spiral or serpentine) coolant channel and a circumferentially disposed gutter in the rotor rim, whereby liquid coolant is fed directly from the gutter to each winding or sinuous cooling channel via the reverse flow preventing means. Preferably, a serpentine conduit path extending over at least a portion of the bucket platform is interposed in series between each convoluted cooling channel in the airfoil and the reverse flow preventing means. The uniform supply of coolant to each coolant path (which includes a convoluted cooling channel) is insured by locating the openings to the coolant supply conduits at equal intervals around the circumference of the gutter.

BRIEF DESCRIPTION OF THE DRAWING

The exact nature of this invention as well as objects and advantages thereof will be readily apparent from consideration of the following specification relating to the annexed drawings in which.

DESCRIPTION OF THE PREFERRED EMBODIMENT

Figure 1:
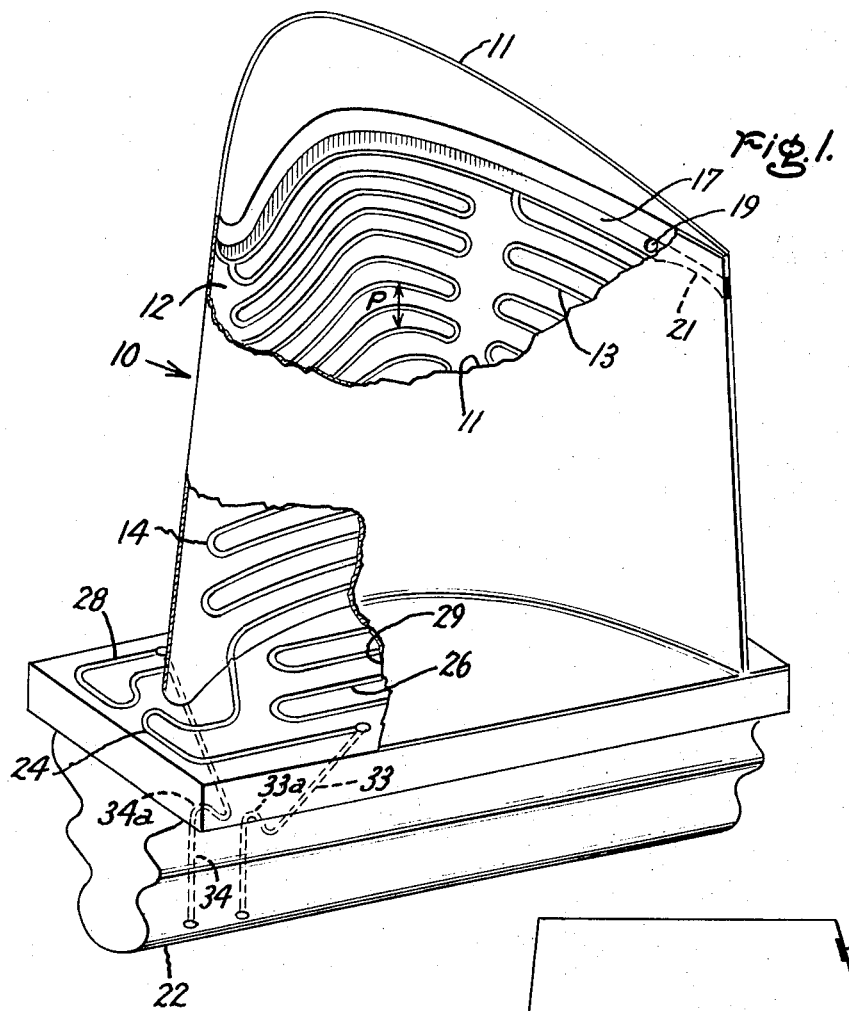
FIG. 1 is a three-dimensional view, partly cut away, showing a typical overall arrangement for at least one of the coolant paths for a turbine bucket constructed according to this invention, to promote clarity only two of the liquid traps are shown.
Figure 2:
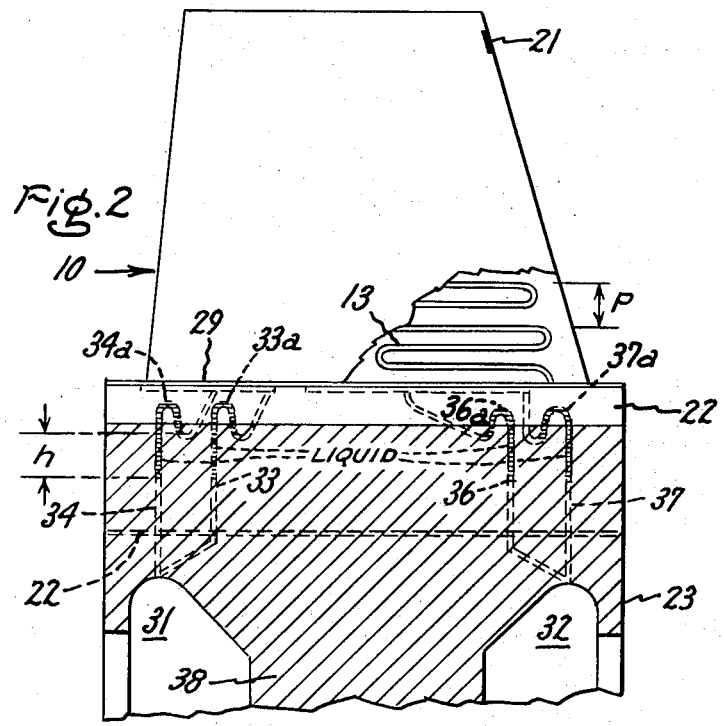
FIG. 2 is a view in section through the rotor disk showing the pressure side of the bucket of FIG. 1 in elevation and coolant supply channels for each of four coolant paths, two on each side of the bucket.
Figure 3:
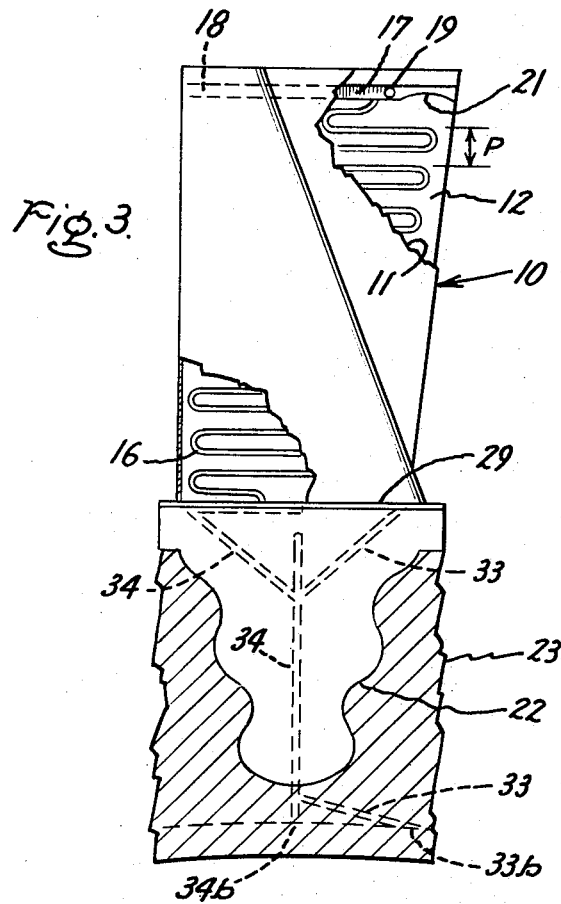
FIG. 3 is a side elevation of the turbine rim and bucket shown in FIG. 2.
Figure 4:
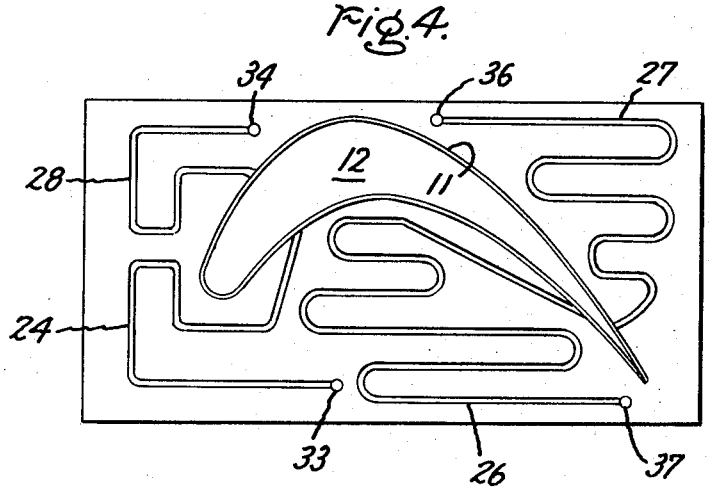
FIG. 4 is a plan view (platform skin removed) of the structure in FIG. 1 showing serpentine coolant grooves in the platform surface and the interconnection of these grooves with the outlets from the coolant supply conduits shown in FIG. 2.

The airfoil surfaces of turbine bucket 10 are provided by metal skin 11, a portion of which is shown cut away from the pressure side of the bucket. Skin 11 is bonded to strut, or core, 12 having a plurality of convoluted grooves, such as serpentine grooves 13 and 14, formed in the surfaces of strut 12 winding generally chordwise thereacross. The overall pattern is disposed to progressively transmit the coolant from the root toward the tip of strut 12. As is shown the chordwise-extending segments of grooves 13, 14 constitute by far the greatest amount of the total length of these grooves.

The cooling channels, or passages, for the surfaces of the completed bucket 10 are thus defined by the skin 11 and grooves, such as the grooves 13, 14. A similar arrangement of one or more grooves extending in a serpentine pattern would be disposed on the suction face of strut 12. These serpentine grooves, as well, are covered by skin 11 to define cooling channels for that face of bucket 10. One such serpentine pattern is designated by numeral 16.

At the radially outer ends thereof, the serpentine cooling channels (preferably rectangular in cross section) are in flow communication with, and terminate at, manifold 17 (and a similar manifold 18 on the suction side) recessed into core 12. Near the trailing edge of bucket 10 a cross-over conduit (not shown) connects manifold 18 with manifold 17 via opening 19. The discharge of coolant flow from both manifolds is accomplished through convergent-divergent nozzle 21, the purpose of which is described in greater detail hereinbelow.

Various arrangements of convoluted cooling channels including a spiral configuration are shown in U.S. Pat. Application Ser. No. 345,538 — Grondahl, filed Mar. 28, 1973. The Grondahl application, assigned to the assignee of the instant application, is incorporated by reference.

U.S. Pat. No. 3,533,712 — Kercher discloses the use of internally-located radially-extending serpentine passages for the flow of cooling fluid (air) through a turbine bucket. The patentee recognizes that the heat flux chordwise of the bucket will vary greatly while the heat flux is essentially constant along a radial line. He puts this information to use by connecting together in a serpentine configuration several radially-extending passages each with a constant cross-sectional area that differs from the cross-sectional area of the other passages. Such an arrangement is not adaptable to liquid cooling.

If such radially-directed serpentine passages were to be used for liquid cooling all legs of the serpentine series would have to remain full of the liquid (except for slugs of vapor that may develop and be pushed along by the liquid) moving at relatively low velocity except for the last leg of the serpentine passage in which the coolant stream would move radially outward. The restriction of having most of the length of the serpentine passage operate full of low velocity liquid flow would result in:
a. an unstable cooling system,
b. isolation of liquid coolant from portions (wherever large slugs of vapor prevail) of the cooling channel producing localized overheating and
c. deposition of any impurities in the coolant.

Even the use of very pure coolant is only a partial solution to these problems. Thus, the arrangement disclosed in Kercher is unsuitable to liquid cooling although it provides an effective approach to air cooling.

The use of serpentine passages communicating directly (i.e. without interposed metering means) with liquid coolant supplied to the turbine disk is, therefore, an unworkable solution to the problem at hand (namely, the elimination of the metering weir) in the absence of the realization that long tortuous coolant paths can be operated as "open" coolant paths, if centrifugal force is properly applied to the coolant flow. Just such a condition is found to exist, if the convolutions of the tortuous coolant path are made to extend predominantly in the generally chordwise direction.

The generally radial distance indicated by the letter P between corresponding points on chordwise-extending segments of the convoluted cooling channel as well as the dimensions of the cooling channels are a function of:
1. the local heat flux at the exterior of turbine bucket 10 (which in turn is a function of the local working fluid temperature pressure and flow field);
2. the thickness of the skin;
3. the thermal conductivities of the skin and core materials;
4. allowable skin surface temperature (which in turn is dependent upon the fatigue life of the skin material under the thermal strain imposed by the operating conditions) and
5. the coolant heat transfer coefficient as determined by the coolant flow conditions and the thermodynamic state (temperature, pressure and enthalpy) of the coolant.

An important feature of this invention is the utilization of convoluted patterns for the cooling channels, in which channels in spite of the tortuous nature thereof coolant liquid always has a free surface (i.e. the channels do not, and need not, run full). The coolant path is open such that liquid and vapor are each free to move without disturbing each other. The extremely large centrifugal force exerted on the system readily urges the liquid coolant through the most tortuous small cross-section channel pattern required. Under the unfluence of the rotation of the rotor disk the liquid coolant is disposed over surfaces of the channels that are the most radially-outward and away from the direction of rotation. As the result the liquid coolant in each channel has a free surface and, as vapor is generated, the continuity of the liquid flow is not interrupted thereby.

Although the velocity of the liquid coolant flow is reduced from the velocities of flow that would prevail for liquid passing through radial cooling channels in the Moore application, the velocity would still be of the order of about 25 times the velocity of the same liquid coolant, if used in the radially-directed serpentine passage of Kercher.

A determination of maximum cooling channel pitch as a function of heat flux has been set forth in Table I below assuming a given set of conditions to allow for the utilization of various materials for the construction of the bucket cores and skins. These assumptions are:

1. The skin and core thermal conductivities are considered equal to about 45 BTU ft/hr ft$^2$ °F; lower values of thermal conductivity will decrease the maximum allowable pitch.
2. The maximum allowable bucket skin surface temperature is to be 1,400°F; a lower temperature limit will decrease the maximum allowable pitch.
3. The temperature of the liquid coolant is to be 100°F; an increase in this limit will decrease the maximum allowable pitch.
4. The skin thickness is to be 0.010 inch; increasing the thickness of the skin will decrease the maximum allowable pitch.
5. Cooling channel dimensions are to be 0.030 × 0.030 inch; an increase in the channel cross-sectional area will decrease the pitch in those locations on the bucket at which the cooling problem is the most severe (coolant film not in contact with the skin).
6. The liquid coolant is in contact with the skin inside the cooling channel. Of course, in most locations on the bucket less favorable conditions prevail and the coolant flows along one side of the cooling channel or, possible, even the bottom. Maximum allowable cooling channel pitch will be smaller, because of such areas.

TABLE I

| Heat Flux (BTU/ft$^2$/hr) | Maximum Pitch (inches) |
|---|---|
| 1 × 10$^6$ | 0.6 in. |
| 1.5 × 10$^6$ | 0.4 in. |
| 2 × 10$^6$ | 0.33 in. |

The root portion 22 of bucket 10 fits into a mating slot in rim 23. Such buckets are held in place in the disk rim by retaining rings (not shown) or retaining pins (not shown).

Steel alloys may be used for the skin and core, these alloys preferably contain at least 12 percent by weight of chromium or are corrosion resistant and heat treatable to achieve high strength. Conventional brazing alloys having melting points ranging from 700°–1,200°C may be used.

Each serpentine cooling channel pattern formed in the surface of core 12 is connected to, and is in flow communication with, a serpentine groove (e.g. one of grooves 24, 26, 27, 28) formed in the upper surface of root portion 22. Serpentine platform cooling channels are defined by such grooves together with platform skin 29. Each such channel serves to cool a portion of the platform surface.

The terminal end of each platform serpentine pattern is in flow communication with one or the other of gutters 31, 32 via coolant supply conduits shown passing through root 22 and the intervening portion of rim 23 to reach gutters 31 and 32. The openings 33b and 34b from channels 33, 34 into gutter 31 for the full complement of buckets 10 are equally spaced so that each cooling path receives equal input of coolant. The same is true for openings from channels 36, 37 into gutter 32. Coolant supply conduits 33, 34, 36, 37 are in flow communication with platform serpentine segments 24, 28, 27, 26, respectively (and, thereby, to the airfoil coolant channels to which they conduct the liquid coolant).

Coolant supply conduits 33, 34, 36, 37 have coolant trap configurations 33a, 34a, 36a, 37a, respectively, formed therein. The function exercised by each trap is to provide a liquid coolant seal and prevent the upstream (opposite to the direction of distribution of the liquid coolant) flow of vapor generated in the serpentine airfoil and platform coolant patterns. This capability, in addition to preventing slowdown of the liquid flow (which would be caused by the reverse flow of vapor) also, in combination with converging-diverging nozzle 21, enables pressurization of the serpentine cooling channel patterns.

In order to reduce at least in part the power required to pump the coolant through the cooling circuit(s), the mass flow of liquid coolant employed is reduced. This reduction in mass flow in turn results in the vaporization of some or all of the liquid coolant, particularly in the turbine bucket cooling channels. Generally, the volume of vapor so generated is orders of magnitude larger than the volume of the liquid present in the cooling channels and the velocities of this vapor is very high. The vapor is free to move at a different velocity from the coolant liquid in the convoluted cooling channels due to the centrifugal effect.

As a second important aspect of this invention, traps 33a, 34a, 36a, 37a are employed to prevent any upstream flow of this vapor so as not to slow down the passage of the liquid coolant. If the transit of the liquid coolant were to be slowed down, the thickness of the liquid film in the passages of the cooling circuits would be increased. Such an increase in liquid layer thickness would reduce the high convective heat transfer coefficient and reduce the effectiveness of bucket cooling.

The extent to which pressure will increase in convoluted coolant passages will depend upon a) the rate at which coolant is supplied, b) the desired operating temperature of the bucket, c) the area of the throat of nozzle 21 and d) the heat transferred from the bucket to the coolant within the distribution circuit.

As the pressure in the coolant circuits downstream of the coolant traps increases, a difference (indicated by letter "h" for supply conduit 34) between the level of coolant in the two legs of each U-trap develops to balance this pressure. The rest of the volume of each conduit 33, 34, 36, 37 radially inward of the liquid level consists essentially of air, hot gas and/or vapor. Liquid coolant entering the coolant supply conduits during rotation of the system disposes itself over the trailing wall of these conduits as it moves through the air/gas/vapor volume until the coolant liquid reaches the liquid level.

As is described in the above-identified Moore application the increase of pressure in each coolant path upstream of nozzle 21 can be made high enough so that the discharge of vapor through nozzles 21 is at supersonic velocity providing a very substantial force vector in the direction opposite to the direction of rotation of blades 10 effective to recoup at least in part the cooling pumping losses.

As is described in the aforementioned Kydd patents, cooling liquid (usually water) is sprayed at low pressure in a generally radially outward direction from nozzles (not shown, but preferably located on each side of disk 38) and impinges on disk 38. The coolant thereupon moves into circumferentially extending gutters 31, 32. The cooling liquid is retained in the gutters until this liquid has accelerated to the prevailing disk rim velocity.

After the cooling liquid in gutters 31, 32 has been so accelerated, it passes to coolant supply conduits 33, 34 for distribution to the various convoluted coolant paths and discharge from the bucket via the manifolds and nozzle.

A uniform supply of coolant to each coolant supply conduit fed by a given gutter is achieved by spacing the inlets to these conduits at equal intervals all the way around the gutter circumference.

The cooling of the platform may be accomplished by the use of a single pool (or a series of interconnected pools) so long as any given pool cavity is properly baffled and in flow communication with one of gutters 31, 32 and with one of the convoluted cooling channels below the surface of the airfoil portion of bucket 10. Care must be taken to design for stress transfer between airfoil and root, of course.

The turbine buckets described herein are made by investment casting as generally described in U.S. Pat. No. 3,678,987 — Kydd. Preferably the bucket cores are made solid. Any passageways passing through the bucket root or formed in the platform surface of the root and extending under the base of the core airfoil portion are provided for by the inclusion of appropriately shaped leachable ceramic (e.g. quartz tubing) bodies in the wax replicas from which the ceramic shell molds are made. After the castings (bucket cores and roots) have been made with the cooling groove patterns cast in the surface thereof, the ceramic shells are removed. Thereafter, the leachable ceramic members are removed in a molten salt bath.

The number of serpentine cooling channel patterns employed under the airfoil surface of bucket 10 and the span of metal permitted between successive chordwise-extending portions of the convoluted channels should be designed to match the amount of local heat transfer required. Single or multiple helical patterns can be employed for the airfoil cooling channels as well as the sinusoidal configurations shown.

The cross-sectional area of the airfoil cooling channels can be varied as a function of the heat flux, which varies widely chordwise of the bucket. However, it is preferred that the dimensions of any given cooling channel (e.g. pattern 13) be kept substantially constant.

By feeding the coolant directly from the gutter into the various coolant circuits, the limitations placed upon coolant metering by the use of axially directed weirs have been removed and, in addition, a greatly simplified turbine rotor design results. More positive control of the coolant flow along each coolant circuit is obtained and, as well, the effect of internal coolant erosion on the controlled distribution of coolant through the system has diminished due to the reduction in coolant flow velocities in the cooling circuits. This invention is equally applicable to the fabrication of both large and small turbine buckets.

This invention has been illustrated in connection with a liquid cooled gas turbine, but application can be made thereof to any liquid cooled rotor system, e.g. a compressor, which would in essence comprise the general structure shown herein operated in reverse to work on a gas instead of having gaseous working fluid exert force on a rotor disk via the buckets.

The term "vane," where employed, is intended to encompass an airfoil-shaped element (including the root structure) as is used both in high temperature turbomachines and in compressor rotors in which cooling is required. The term "pitch," where employed, refers to the distance between corresponding points on successive chordwise-extending segments of the same convoluted cooling channel. Preferably this is a substantially uniform dimension. Also, the term "vapor" is intended to include both gas and vapor.

What we claim as new and desire to secure by Letters Patent of the United States is:

1. In a vane structure adapted for mounting in a rotating element of a machine wherein the airfoil surfaces of the vane are subjected to contact with hot gas, the vane comprising an airfoil-shaped core and a conforming skin affixed thereto, said core and said skin defining at least one open-ended subsurface passage therebetween for the transit of coolant therethrough, said at least one passage being adapted to receive coolant flow at the radially inner end thereof from a source of coolant and to discharge the coolant flow from the radially outer end thereof into a chordwise-extending manifold, said manifold in turn being adapted to discharge coolant flow from said vane, the improvement in which:
   a. said at least one passage has a substantially constant depth along the length thereof and is disposed in a convoluted configuration with most of each successive convolution extending in the generally chordwise direction and
   b. means for self-establishment of a liquid seal with the coolant flow, said means being located in and stationary relative to the root of said vane and being in series flow communication between said source of coolant and said at least one passage, the reverse flow of coolant vapor from said at least one passage being prevented thereby.

2. The improvement of claim 1 wherein a plurality of subsurface passages of convoluted configuration are employed, each passage being arranged in a serpentine pattern confined to one face of the vane and each passage having separate liquid seal-establishing means in series flow communication therewith.

3. The improvement of claim 2 wherein one face of the vane is provided with a plurality of separate subsurface serpentine cooling patterns.

4. The improvement of claim 1 wherein the liquid seal-establishing means is a tubular member having an inverted U in the length thereof.

5. In a gas turbine wherein a turbine disk is mounted on a shaft rotatably supported in a casing, said turbine disk extending substantially perpendicular to the axis of said shaft and having turbine buckets affixed to the outer rim thereof, each bucket comprising an airfoil-shaped core and a conforming skin affixed thereto, said buckets receiving a driving force from a hot motive fluid moving in a direction generally parallel to said axis of said shaft and the driving force being transmitted to said shaft via said turbine disk, means located radially inward of said buckets for introducing liquid coolant within said turbine in a radially outward direction to enter an open-ended coolant distribution circuit comprising in the airfoil of each of said buckets at least one subsurface cooling channel defined by said core and said skin, said at least one cooling channel being adapted to receive liquid coolant at the radially inner end thereof, and a manifolding and discharge portion located in the radially outer end region of the airfoil of the given bucket, said manifolding and discharge portion being in flow communication with the radially outer end of said at least one cooling channel, the improvement in the above combination comprising:
   a. at least one annular gutter region forming part of the rim of said turbine disk to receive liquid coolant,
   b. said at least one subsurface cooling channel being of a substantially constant depth along the length thereof and being arranged in a convoluted configuration with most of each of the successive convolutions extending in the generally chordwise direction, the radially inner end of said convoluted configuration being in flow communication with said gutter region and
   c. means for self-establishment of a liquid seal with the coolant flow, said means being stationary relative to and in series between said gutter region and said radially inner end, the reverse flow of coolant vapor from said convoluted configuration being prevented thereby.

6. The improvement of claim 5 wherein the inner end of the convoluted configuration is connected to the liquid seal establishing means by a closed conduit having as part of the length thereof a subsurface cooling passage of convoluted configuration located in platform structure at the base of the airfoil.

7. The improvement of claim 6 wherein the airfoil of the given bucket is provided with a plurality of subsurface cooling channels of convoluted configuration, each of said channels being connected to a separate closed conduit in flow communication with a separate liquid seal establishing means, said closed conduit having as part of the length thereof a subsurface cooling passage of serpentine configuration located in the platform structure.

8. The improvement of claim 5 wherein the liquid seal-establishing means is a tubular member having an inverted U in the length thereof.

9. The improvement of claim 8 wherein the liquid seal establishing means is disposed substantially radially of the turbine disk.

10. The improvement of claim 5 wherein the maximum pitch for the convoluted configuration is about 0.6 inch.

* * * * *